Oct. 23, 1962  E. A. WITTMAN ETAL  3,059,952
DEVICE FOR PREVENTING CAR DOORS FROM OPENING
Filed Nov. 5, 1958
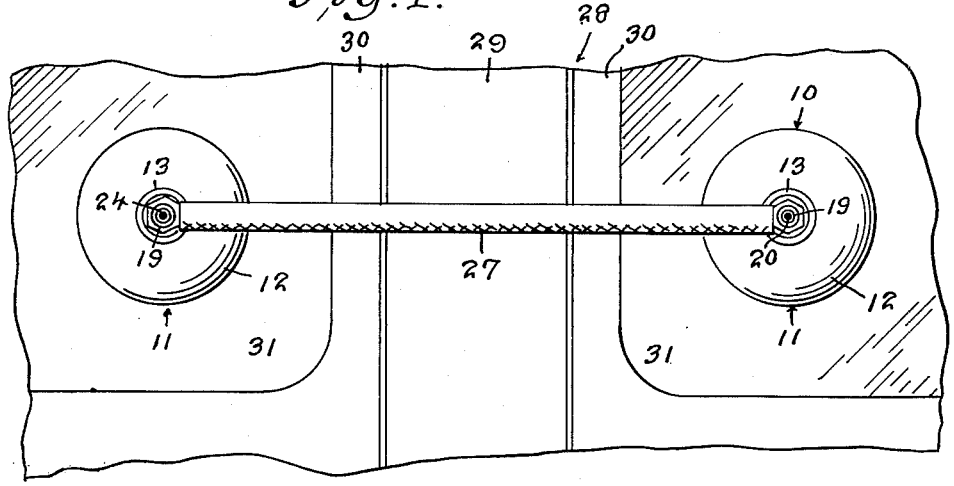
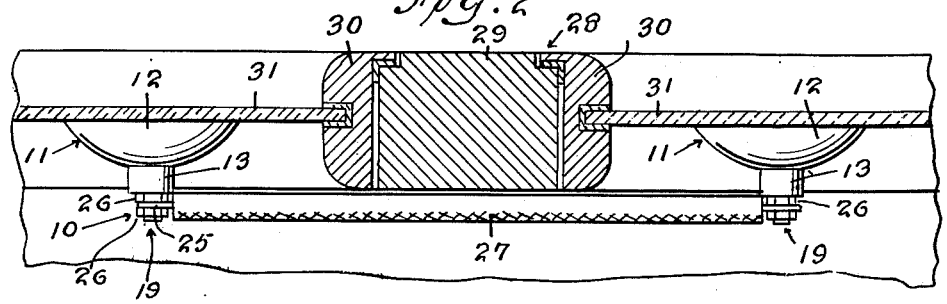
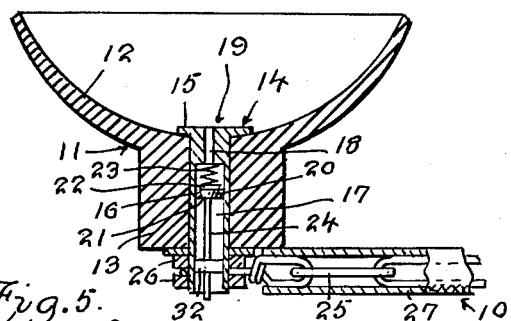
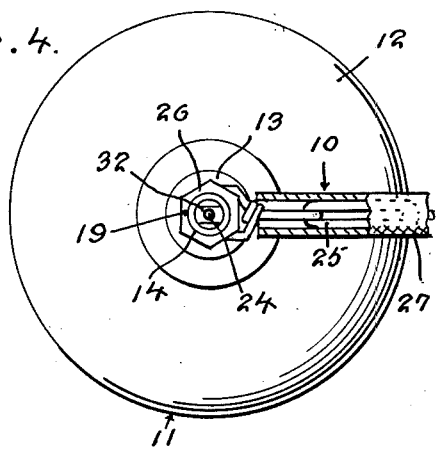
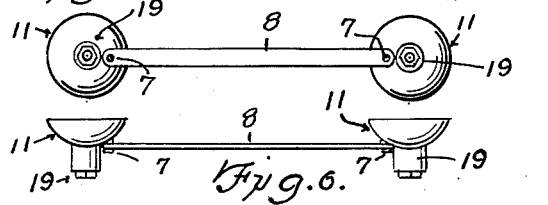
INVENTORS.
Joseph Pollak
Emil A. Wittman
BY Victor J. Evans & Co.
ATTORNEYS

United States Patent Office 3,059,952
Patented Oct. 23, 1962

3,059,952
DEVICE FOR PREVENTING CAR DOORS FROM OPENING
Emil A. Wittman, 1435 Van Horiten Ave., Clifton, N.J., and Joseph Pollak, 170 Mount Pleasant Ave., Wallington, N.J.
Filed Nov. 5, 1958, Ser. No. 772,062
1 Claim. (Cl. 292—288)

This invention relates to a holding device, and more particularly to a device for preventing accidental or unauthorized opening of doors such as vehicle doors.

The object of the invention is to provide a device which is adapted to be used for preventing opening of vehicle doors such as doors of an automobile, and wherein the device of the present invention is constructed so that by proper actuation thereof, the doors can be readily opened.

Another object of the invention is to provide a door holding or locking device which includes suction cups that are adapted to be arranged in engagement with the windows of doors such as the front and rear doors of an automobile or other vehicle, so that the doors cannot be opened until the vacuum pressure or suction is released, and wherein there is provided a manually operable means for selectively releasing the vacuum pressure.

A further object of the invention is to provide a device for preventing car doors from opening, which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a fragmentary elevational view illustrating the device of the present invention.

FIGURE 2 is a view taken at right angles to the view shown in FIGURE 1, and showing certain of the parts in section.

FIGURE 3 is an enlarged sectional view illustrating certain constructional details of the present invention.

FIGURE 4 is an enlarged elevational view taken at right angles to the view shown in FIGURE 3, and with parts broken away and in section.

FIGURE 5 is an elevational view illustrating a modification.

FIGURE 6 is a view taken at right angles to the view shown in FIGURE 5.

Referring in detail to the drawings, the numeral 10 indicates the device of the present invention which is adapted to be used for preventing car doors from accidentally opening, and the device 10 includes a pair of similar suction cups which are each indicated by the numeral 11. Each suction cup 11 includes a rounded or arcuate portion 12, FIGURE 3, and there is further provided an enlargement or shoulder 13.

The numeral 14 indicates a support member which forms part of a valve assembly 19. The support member 14 includes an inner flange 15 which is contiguous to the rounded portion 12, and the support member 14 extends through an opening 16 in the shoulder 13. Each support member 14 is provided with a chamber or recess 17 as well as a bore or opening 18 of reduced diameter.

Arranged in the chamber 17 is a partition 20 which is provided with an opening or valve seat 21, and a valve 22 is mounted for movement into and out of opened or closed relation with respect to the valve seat 21. A coil spring 23 engages the valve 22 for normally urging the valve 22 into closed relation with respect to the valve seat 21. The numeral 24 indicates a valve stem which is connected to the valve 22 or formed integral therewith.

For connecting the pair of suction cups 11 together, there is provided a chain 25 which is arranged in engagement with the outer end portions of the support members 14, and the chain 25 is maintained connected to the support members 14 by means of nuts or securing elements 26. A sleeve 27 of a suitable resilient material or suitable plastic-like material surrounds the chain 25 so as to prevent the chain from injuring or damaging parts of the vehicle which it may contact.

In FIGURES 1 and 2 the numeral 28 indicates a portion of a conventional vehicle such as an automobile which includes a column or frame 29, and the numeral 30 indicates doors such as front and rear doors which are mounted for movement into and out of opened or closed position, each of the doors 30 being provided with the usual window 31.

The movable stems 24 extend through guide members 32 which help retain the stems 24 in their proper position as they are moved back and forth. Furthermore, when the parts are in the position of FIGURE 3 an end of the stem 24 extends outward slightly beyond the support member 14 so that a person's finger can engage the outer end of the stem 24 when vacuum pressure or suction is to be released.

From the foregoing, it is apparent that there has been provided a device which is adapted to be used for preventing doors such as vehicle doors from accidentally opening. It is to be noted that when doors such as the doors 30 are to be kept closed, the pair of suction cups 11 are arranged in engagement with the windows 31 of the doors 30, and the chain 25 which is surrounded by the protective shield 27 connects the suction cups together and extends across the column 29. The shield 27 thus prevents the chain from damaging the interior of the vehicle, and it will be seen that with the pair of suction cups 11 engaging the windows 31, that neither of the doors can be opened without first releasing the vacuum pressure.

To release the vacuum pressure, as for example when either or both of the doors 30 are to be opened, it is only necessary to press in on the valve stem 24 which causes the valve 22 to move away from the valve seat 21 so that vacuum pressure within the suction cup 11 will be released through the bore 18 and through the chamber 17. When pressure is released on the stem 24, the spring 23 will return the valve 22 to its closed position with respect to the seat 21, as for example as shown in FIGURE 3.

The parts can be made of any suitable material and in different shapes or sizes.

Different means can be provided for releasing the vacuum from the suction cups or plungers. The shield 27 may extend all the way across the chain 25, or else it may cover only a portion of the chain. Furthermore, a resilient or rubber strip may be used in conjunction with the device for helping prevent the device from rubbing against the column 29 or other parts of the vehicle.

Thus, it will be seen that according to the present invention there has been provided a device which is especially suitable for preventing the opening of car doors and wherein a novel means is provided for releasing suction as for example when the doors are to be opened.

When the device is mounted on the vehicle and with the suction cups 11 engaging the windows 31 as shown in FIGURES 1 and 2, it will be seen that the car doors cannot accidentally open. The suction cups may be made of a suitable material such as rubber, and sufficient suction is present to prevent the devices from slipping. If desired the suction cups may be dampened before using so as to increase the holding power. The parts can be varied in construction or shape to fit different makes or models of vehicles.

Referring now to FIGURES 5 and 6 of the drawings, there is shown a modification wherein the suction cups 11 are connected together by means of a thin metal bar or strap 8, and the strap 8 is secured to the cups 11 by means of a suitable securing element such as a screw or bolt 7 whereby the parts will be held in their proper position. The device shown in FIGURES 5 and 6 is adapted to be used in the same manner as the previously described device.

Minor changes in shape, size and rearrangement of details coming within the field of invention claimed may be resorted to in actual practice, if desired.

We claim:

A device for preventing accidental or unauthorized opening of doors such as vehicle doors comprising a pair of spaced apart suction cups for engaging windows of the vehicle doors, each of said suction cups including a rounded portion and an enlarged tubular shoulder, a valve mechanism including a support member extending through said shoulder and having a flange on its inner end contiguous to said rounded portion, there being a compartment in the outer portion of said support member, there being a bore in the inner portion of said support member communicating with said compartment, a partition arranged in said compartment and provided with a valve seat, a movable valve mounted for movement into and out of engagement with said valve seat, a coil spring abutting said valve for normally urging the valve into closed relation with respect to the valve seat, a stem connected to said valve, apertured guide means mounted in the outer end of said compartment and receiving the stem connected to said valve to retain the stem in proper position, a chain having its ends connected to said support members, a resilient sleeve surrounding said chain, the outer surface of said support member adjacent the outer ends thereof having threads thereon, and securing elements engaging said threads for maintaining the opposite ends of the chain connected to said support members.

References Cited in the file of this patent

UNITED STATES PATENTS

| | | |
|---|---|---|
| 186,319 | Dietz | Jan. 16, 1877 |
| 890,518 | Kleidmann | June 9, 1908 |
| 1,122,199 | Gadbois | Dec. 22, 1914 |
| 1,760,551 | Hasting | May 27, 1930 |
| 1,849,338 | Stansberry | Mar. 15, 1932 |
| 2,198,765 | Featherstone et al. | Apr. 30, 1940 |
| 2,303,393 | Schmidt | Dec. 1, 1942 |
| 2,565,793 | Weismantel | Aug. 28, 1951 |
| 2,596,054 | Tallman | May 6, 1952 |
| 2,608,711 | Moore | Sept. 2, 1952 |
| 2,856,814 | Dillmann | Oct. 21, 1958 |
| 2,915,271 | Ruttger | Dec. 1, 1959 |
| 2,918,282 | Waterval | Dec. 22, 1959 |

FOREIGN PATENTS

| | | |
|---|---|---|
| 326,377 | Great Britain | Mar. 13, 1930 |